US012800006B2

(12) United States Patent
Kim

(10) Patent No.: US 12,800,006 B2
(45) Date of Patent: Nov. 17, 2026

(54) HYDRAULIC MOUNT

(71) Applicants: Hyundai Motor Company, Seoul (KR); Kia Corporation, Seoul (KR)

(72) Inventor: Seung Won Kim, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 534 days.

(21) Appl. No.: 18/240,047

(22) Filed: Aug. 30, 2023

(65) Prior Publication Data

US 2024/0309935 A1 Sep. 19, 2024

(30) Foreign Application Priority Data

Mar. 16, 2023 (KR) ........................ 10-2023-0034443

(51) Int. Cl.
*F16F 13/14* (2006.01)
*B60K 1/00* (2006.01)
*B60K 5/12* (2006.01)

(52) U.S. Cl.
CPC ............ *F16F 13/1445* (2013.01); *B60K 1/00* (2013.01); *B60K 5/1208* (2013.01); *F16F 2226/04* (2013.01)

(58) Field of Classification Search
CPC .. F16F 13/1445; F16F 13/1463; F16F 9/3207; F16F 2226/04; F16F 2230/36; B60K 1/00; B60K 5/1208
USPC ..................................................... 267/140.13
See application file for complete search history.

(56) References Cited

U.S. PATENT DOCUMENTS

2002/0011701 A1* 1/2002 Bik ......................... F16F 13/16 267/140.11
2006/0081427 A1* 4/2006 Gautier ............... F16F 13/1418 188/267
2007/0246870 A1* 10/2007 Siemer .................... F16C 32/06 267/140.12
2016/0298717 A1* 10/2016 Auten ..................... B29C 65/70
2021/0199169 A1* 7/2021 Morton ...................... F16F 1/38
2021/0222753 A1* 7/2021 Abe ....................... F16F 1/3835
2021/0293300 A1* 9/2021 Hahn .................. F16F 13/1445
2022/0032703 A1* 2/2022 Otsu ......................... B60G 7/02
2022/0196107 A1* 6/2022 Gaspar ................ F16F 13/1409
2022/0290733 A1* 9/2022 Kim .................... F16F 13/1463
(Continued)

FOREIGN PATENT DOCUMENTS

DE 102020007844 A1 * 6/2022 .......... F16F 13/1418
KR 2022-0125433 A 9/2022
KR 2023-0084761 A 6/2023

OTHER PUBLICATIONS

Englis machined translation of DE-102020007844-A1, Jun. 26, 2022.*

*Primary Examiner* — Robert A. Siconolfi
*Assistant Examiner* — San M Aung
(74) *Attorney, Agent, or Firm* — MORGAN, LEWIS & BOCKIUS LLP

(57) ABSTRACT

A hydraulic mount, in detail, a bush-type hydraulic mount for an electric vehicle includes an internal pipe, an external pipe disposed outside the internal pipe, and a main rubber formed between the internal pipe and the external pipe. The main rubber includes a plurality of fluid chambers filled with fluid and configured to fluidically-communicate with each other. The main rubber includes a void formed through the main rubber.

16 Claims, 14 Drawing Sheets

(56) References Cited

U.S. PATENT DOCUMENTS

| | | | | |
|---|---|---|---|---|
| 2023/0055754 A1* | 2/2023 | Kim | ...................... | F16F 9/3207 |
| 2023/0173906 A1 | 6/2023 | Kim | | |

* cited by examiner

HYDRAULIC MOUNT

CROSS REFERENCE TO RELATED APPLICATION

The present application claims priority to Korean Patent Application No. 10-2023-0034443, filed Mar. 16, 2023, the entire contents of which is incorporated herein for all purposes by this reference.

BACKGROUND OF THE PRESENT DISCLOSURE

Field of the Present Disclosure

The present disclosure relates to a hydraulic mount, and more particularly, a bush-type hydraulic mount for electric vehicles.

Description of Related Art

Recently, research on an electric vehicle which is an eco-friendly vehicle is being actively conducted. An electric vehicle is driven by a motor instead of a conventional internal combustion engine and is supplied with power from a chargeable battery rather than petroleum fuel.

A power electronics (PE) module is generally mounted at the rear wheels of electric vehicles, which may cause a sense of remaining vibration generated when an electric vehicle goes over a bump. Mounts that have damping in the front and rear direction and the up and down direction of a vehicle are applied to solve the present problem. Such mounts are advantageous in reducing a sense of remaining vibration, but the dynamic characteristic increases for the characteristics of a hydraulic mount in comparison to a rubber mount, so that the noise, vibration & harshness (NVH) performance greatly deteriorates in many cases. Whine noise may be produced, for example.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a bush-type hydraulic mount that can improve a high frequency dynamic characteristic together with damping performance.

The objectives of the present disclosure are not limited to those described above and other objectives not stated herein would be apparently understood by those having ordinary skill in the art that the present disclosure belongs to (hereafter, "those skilled in the art") from the following description.

The features of the present disclosure for achieving the objectives of the present disclosure and performing the characteristic functions of the present disclosure to be described below are as follows.

According to an exemplary embodiment of the present disclosure, a bush-type hydraulic mount includes: an internal pipe: an external pipe disposed outside the internal pipe; and a main rubber formed between the internal pipe and the external pipe. The main rubber includes a plurality of fluid chambers filled with fluid and configured to fluidically-communicate with each other, and the main rubber includes a void formed through the main rubber.

According to an exemplary embodiment of the present disclosure, a method of manufacturing a bush-type hydraulic mount including an internal pipe and a main rubber formed outside the internal pipe and including four fluid chambers includes: disposing a first mold configured to form a first fluid chamber and a second fluid chamber of the four fluid chambers; and disposing a second mold configured to form a third fluid chamber and a fourth fluid chamber of the four fluid chambers.

According to an exemplary embodiment of the present disclosure, there is provided a bush-type hydraulic mount having not only improved damping performance but an improved high-frequency dynamic characteristic.

Effects of the present disclosure are not limited to those described above and other effects may be clearly recognized by those skilled in the art from the following description.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1A:
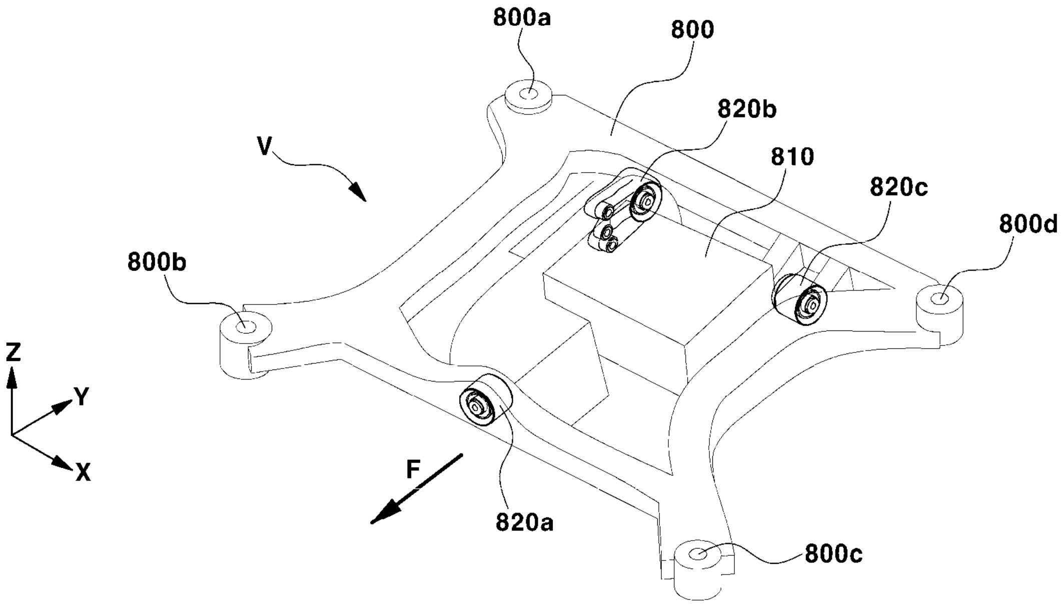
FIG. 1A shows a rear sub-frame of an electric vehicle.

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Description of specific structures and functions included in embodiments of the present disclosure is only an example for describing the exemplary embodiments according to the concept of the present disclosure and the exemplary embodiments according to the concept of the present disclosure may be implemented in various ways. The present disclosure is not limited to the exemplary embodiments described herein and should be construed as including all changes, equivalents, and replacements that are included in the spirit and the range of the present disclosure.

Although the terms first and/or second, etc. may be used herein to describe various elements, these elements should not be limited by these terms. These terms are used only to distinguish one element from another element. For instance, a first element discussed below could be termed a second element without departing from the right range of the present disclosure. Similarly, the second element could also be termed the first element.

It is to be understood that when one element is referred to as being “connected to” or “coupled to” another element, it may be directly connected to or directly coupled to another element or be connected to or coupled to another element, including the other element intervening therebetween. On the other hand, it is to be understood that when one element is referred to as being “directly connected to” or “directly coupled to” another element, it may be connected to or coupled to another element without the other element intervening therebetween. Furthermore, the terms used herein to describe a relationship between elements, that is, “between,” “directly between,” “adjacent,” or “directly adjacent” should be interpreted in the same manner as those described above.

Like reference numerals indicate the same components throughout the specification. The terms used herein are provided to describe embodiments without limiting the present disclosure. In the specification, a singular form includes a plural form unless specifically stated in the sentences. The terms “comprise” and/or “comprising” used herein do not exclude that another component, step, operation, and/or element exist or are added in the stated component, step, operation, and/or element.

The present disclosure will be described hereafter in detail with reference to the accompanying drawings.

An electric vehicle V includes a motor that generates driving power and a power electronics (PE) module that supplies electricity to the motor. Hereafter, these in combination are referred to as a PE module 810.

The PE module 810 is mounted on a vehicle body generally through a bush-type rubber mount. The PE module 810 may be mounted at all of the front wheels and the rear wheels of the electric vehicle V, so that the hydraulic mount according to an exemplary embodiment of the present disclosure may be mounted for any of front wheels and rear wheels.

Figure 1B:
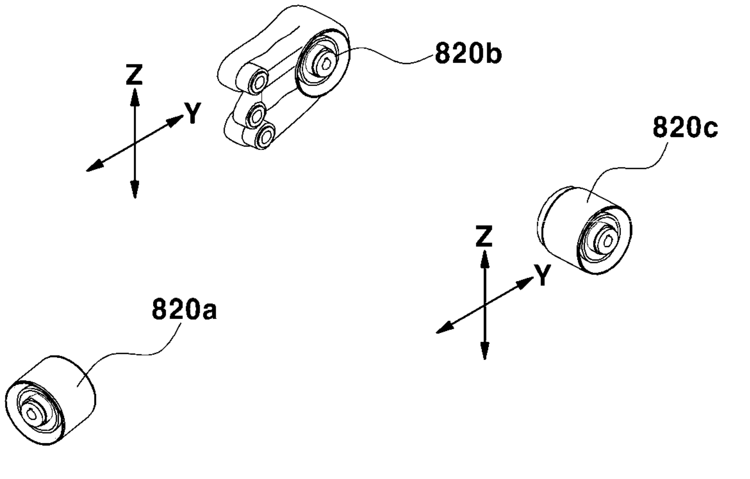
FIG. 1B shows mounts in FIG. 1A.

For example, when the PE module 810 is mounted at a rear wheel, as shown in FIG. 1A, the PE module 810 is mounted on the vehicle body of the electric vehicle V through a rear sub-frame 800. In FIG. 1A, the direction “F” indicates the front direction of the electric vehicle V. The rear sub-frame 800 is mounted on the vehicle body through four bushes **800*a*, 800*b*, 800*c*, 800*d*. The PE module 810 is connected to the rear sub-frame 800 through a plurality of bushes 820*a*, 820*b*, 820*c*. Accordingly, as shown in FIG. 1B, the present configuration causes the electric vehicle V to be highly vulnerable to driving vibration in the front and rear direction (y direction) and the up and down direction (z direction) of the electric vehicle V. Thus, damping of the rear bushes 820*b*, 820*c*** in two directions of the up and down direction (z direction) and the front and rear direction (y direction) is required to reduce such vibrations.

Accordingly, the present disclosure intends to provide a bush-type hydraulic mount that has damping in two directions of a front and rear direction (y direction) and an up and down direction (z direction). The bush-type hydraulic mount according to an exemplary embodiment of the present disclosure is a mount that has damping in two directions of a front and rear direction (y direction) and an up and down direction (z direction) and enables front and rear behavior control and weight-directional behavior control of the electric vehicle V.

Figure 2A:
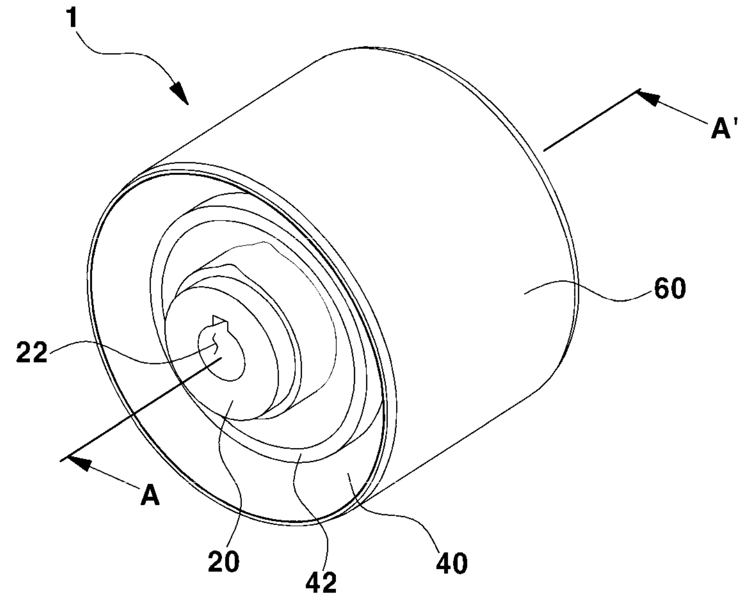
FIG. 2A is a perspective view of a bush-type hydraulic mount according to an exemplary embodiment of the present disclosure.
Figure 2B:
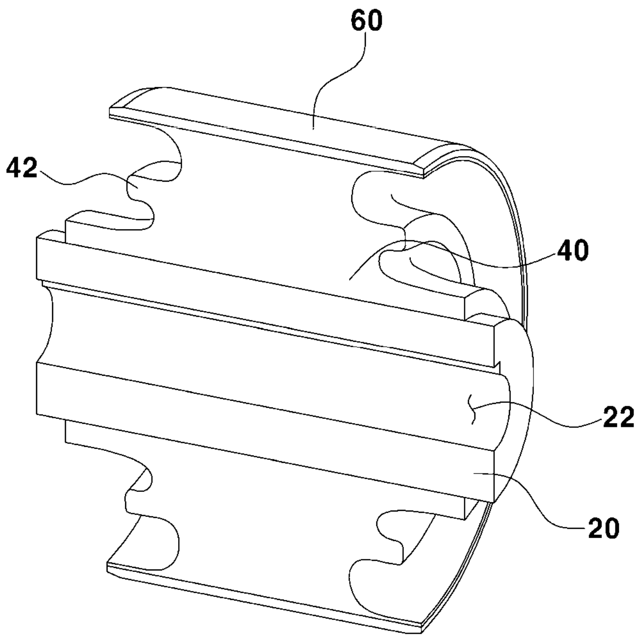
FIG. 2B is a cross-sectional view taken along line A-A' of FIG. 2A.

The bush-type hydraulic mount 1 according to an exemplary embodiment of the present disclosure is a mount including a rubber filled with a fluid. In detail, as shown in FIG. 2A and FIG. 2B, the bush-type hydraulic mount 1 includes an internal pipe 20, a main rubber 40, and an external pipe 60.

The internal pipe 20 is coupled to the PE module 810 and is configured to connect the PE module 810 with the rear sub-frame 800. The internal pipe 20 may be coupled to the PE module 810 through a fastener, such as a bolt. The internal pipe 20 may be formed in a tube shape including a hole 22 therein and may be made of metal.

The main rubber 40 made of rubber is formed on the external circumferential surface of the internal pipe 20. For example, the main rubber 40 may be formed on the external circumferential surface of the internal pipe 20 through vulcanization molding.

The main rubber 40 may be formed through vulcanization molding between the internal pipe 20 and a middle pipe 80 disposed coaxially with the internal pipe 20. The middle pipe 80 is surrounded by the main rubber 40 and may be made of metal. The middle pipe 80 may be formed in a tube shape including a plurality of openings to secure spaces in which fluid chambers 140, 240, 340, 440 of the main rubber 40 are disposed.

Figure 3:
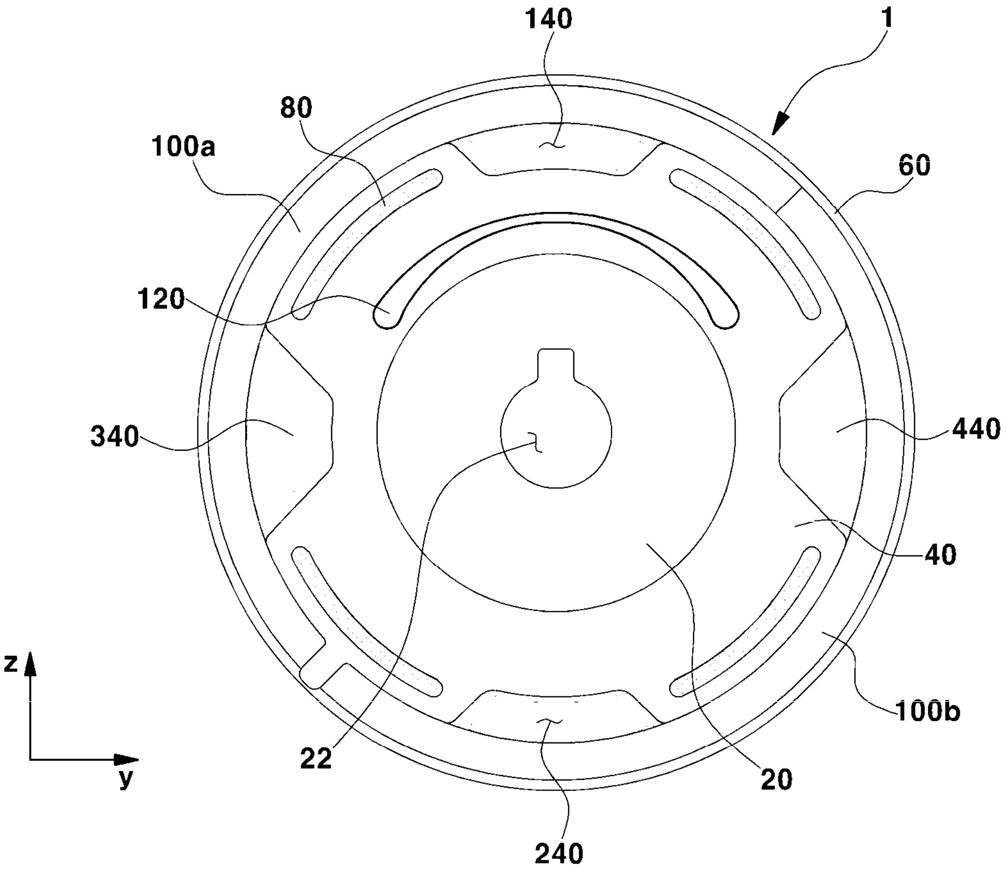
FIG. 3 is a cross-sectional view of the hydraulic mount according to an exemplary embodiment of the present disclosure.

Referring to FIG. 3, a fluid is filled in the fluid chambers 140, 240, 340, 440 of the main rubber 40. The fluid chambers 140, 240, 340, and 440 include an upper fluid chamber 140, a lower fluid chamber 240, a front fluid chamber 340, and a rear fluid chamber 440. The upper fluid chamber 140 and the lower fluid chamber 240 may be formed at about 180 degrees or to face each other in the up and down direction (z direction) in the hydraulic mount 1. The front fluid chamber 340 and the rear fluid chamber 440 may be formed at about 180 degrees or to face each other in the front and rear direction (y direction) of the hydraulic mount 1.

Figure 4:
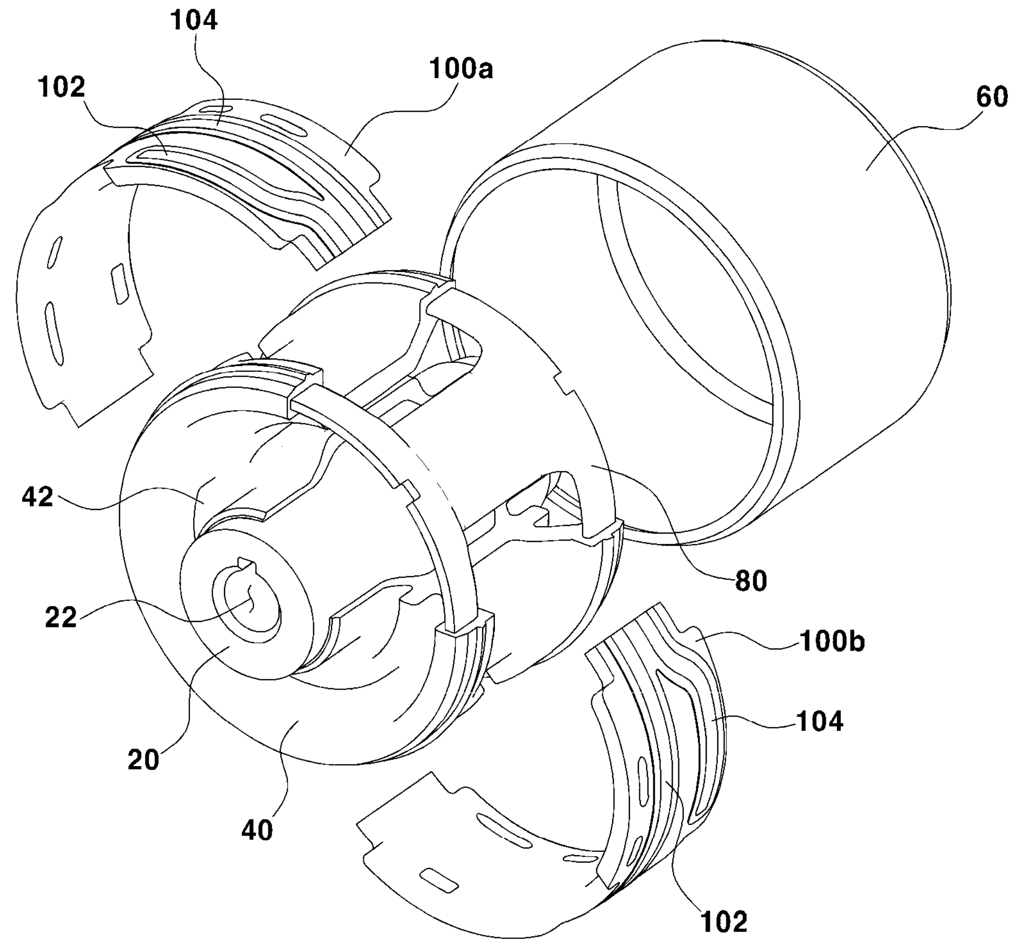
FIG. 4 is an exploded perspective view of the hydraulic mount according to an exemplary embodiment of the present disclosure.

As shown in FIG. 4, two nozzles 100*a*. 100*b* are mounted on the external circumferential surface of the main rubber 40. The nozzles 100*a*, 100*b* may include a first nozzle 100*a* and a second nozzle 100*b* separated from each other. Two channels 102, 104 are formed at each of the nozzles 100*a*. 100*b*. The channels 102, 104 include an up and down channel 102 and a front and rear channel 104. The up and down channel 102 enables the fluid to flow between the upper fluid chamber 140 and the lower fluid chamber 240. The front and rear channel 104 enables the fluid to flow between the front fluid chamber 340 and the rear fluid chamber 440. A hole 106 is formed at an end portion of each of the channels 102, 104 formed at the nozzles 100*a*. 100*b*, so that the fluid can flow between the fluid chambers 140, 240, 340, 440 and the channels 102, 104. In an exemplary embodiment of the present disclosure, the nozzles 100*a*, 100*b* may include plastic, aluminum, steel, etc.

Figure 5:
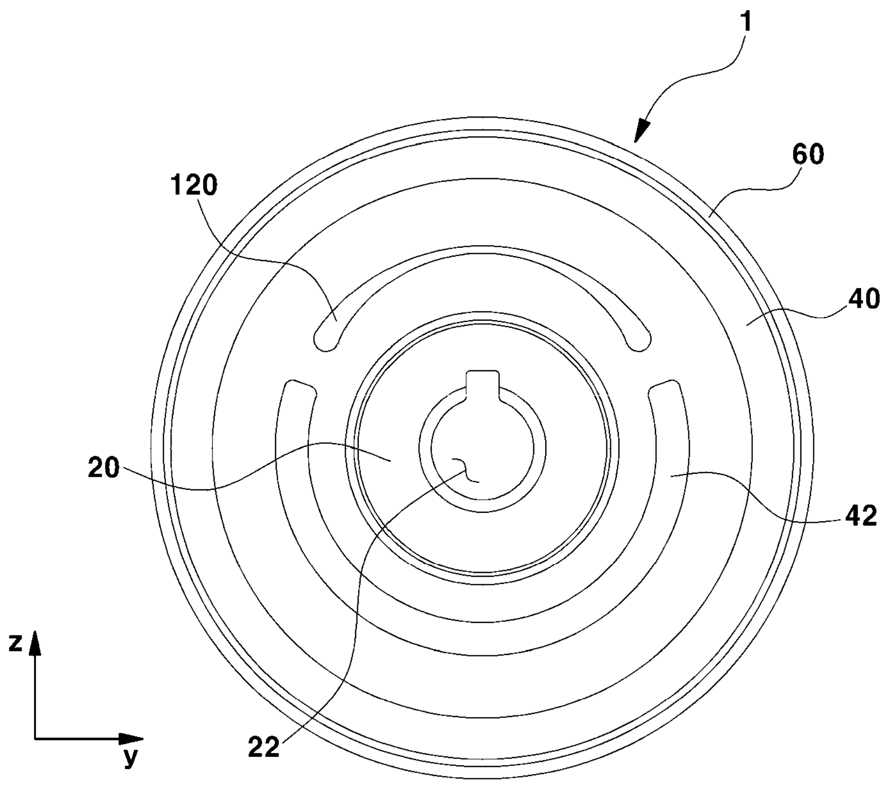
FIG. 5 is a front view of the hydraulic mount according to an exemplary embodiment of the present disclosure.
Figure 6:
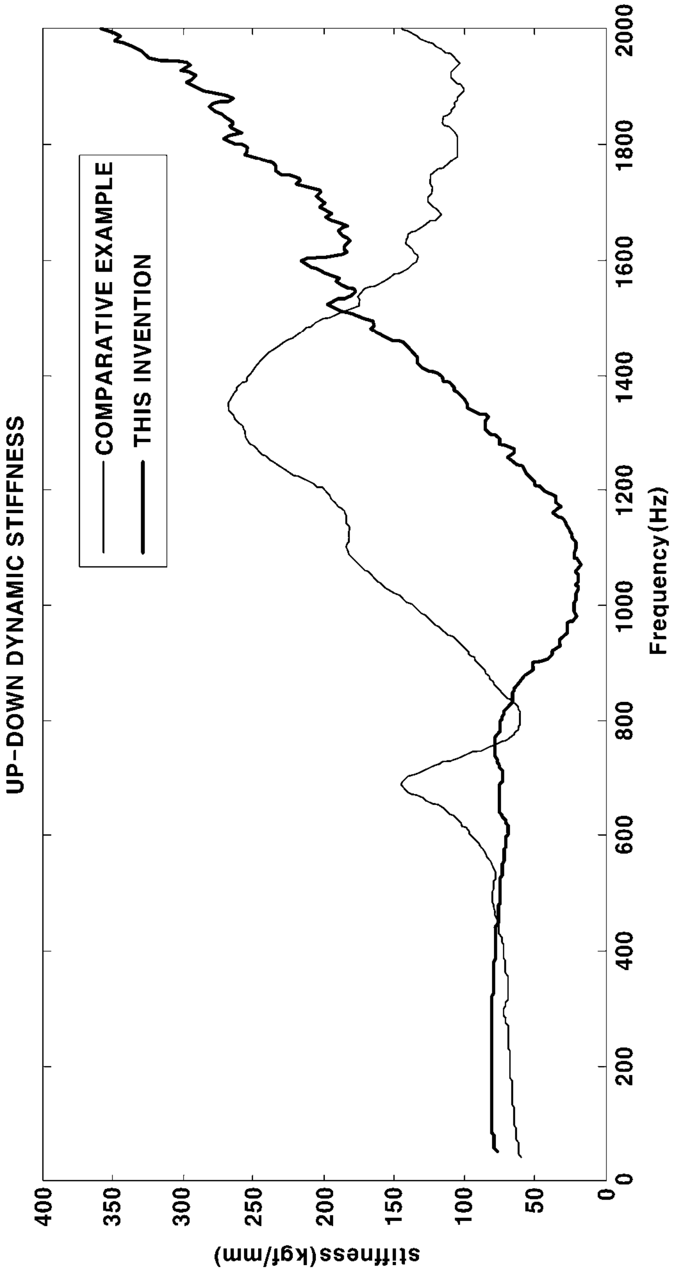
FIG. 6 shows a high-frequency dynamic characteristic effect of the hydraulic mount according to an exemplary embodiment of the present disclosure.

As shown in FIGS. 3 and 5, according to an exemplary embodiment of the present disclosure, the main rubber 40 includes a void 120. The void 120 is formed in the main rubber 40 between the internal pipe 20 and the external pipe 60. In various exemplary embodiments of the present disclosure, the void 120 may extend in the circumferential direction of the main rubber 40 and may be formed in an arc shape. The central angle of the void 120 may be greater than 0 degrees and smaller than 180 degrees. In various exemplary embodiments of the present disclosure, the void 120 may be formed between the upper fluid chamber 140 and the internal pipe 20. In another exemplary embodiment of the present disclosure, the void 120 may be formed between the lower fluid chamber 240 and the internal pipe 20. However, only one void 120 may be formed in the bush-type hydraulic mount 1 to secure the performance intended by the present disclosure. The void 120 provides an effect of improving a high-frequency dynamic characteristic in comparison to a rubber mount. Referring to FIG. 6, it may be seen that the void 120 improves a high-frequency dynamic characteristic in comparison to a rubber mount of the related art (comparative example—no void). According to an exemplary embodiment of the present disclosure, it was possible to improve a dynamic characteristic by separating the upper fluid chamber 140 and the internal pipe 20 using the void 120. The upper fluid chamber 140 functions as a diaphragm and a compression fluid chamber of the mount when there is no void 120, but, as in an exemplary embodiment of the present disclosure, when there is a void 120, the upper fluid chamber 140 functions only as a diaphragm that supports compression liquid. Accordingly, it is possible to decrease a dynamic characteristic and improve durability. The internal pipe 20 may be formed in a bulge type with a large size in comparison to the related art, so it can increase the effect.

The main rubber 40 may include a flap 42. The flap 42 circumferentially extends between the internal pipe 20 and the external pipe 60. In an exemplary embodiment of the present disclosure, the flap 42 may circumferentially extend a predetermined distance.

The external pipe 60 is disposed at an external side of the nozzles 100*a*, 100*b*. The external pipe 60 is disposed to seal the nozzles 100*a*, 100*b* or the channels 102, 104. The external pipe 60 may be configured in a tube type sealing the nozzles 100*a*, 100*b* disposed on the external circumferential surface of the main rubber 40.

Figure 7:
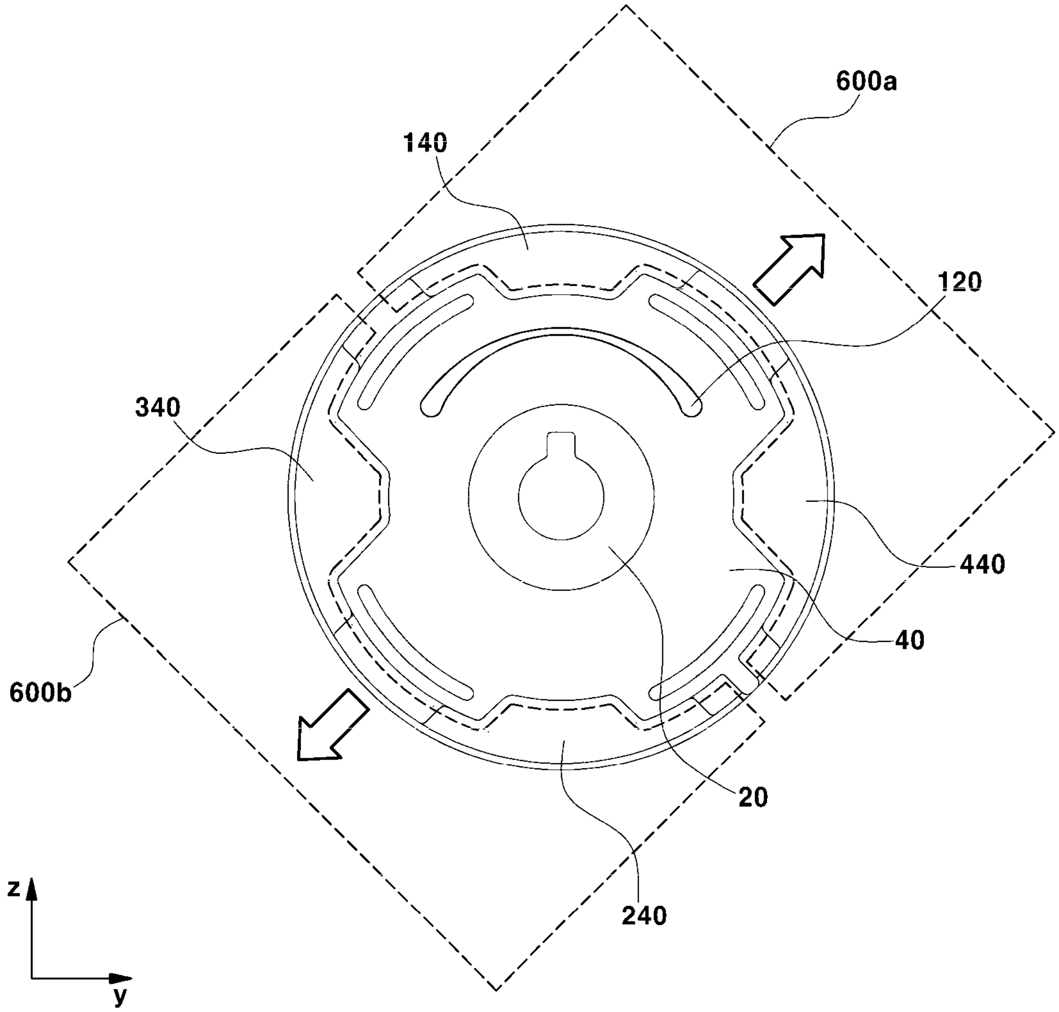
FIG. 7 shows lines of a mold for manufacturing the hydraulic mount according to an exemplary embodiment of the present disclosure.
Figure 8:
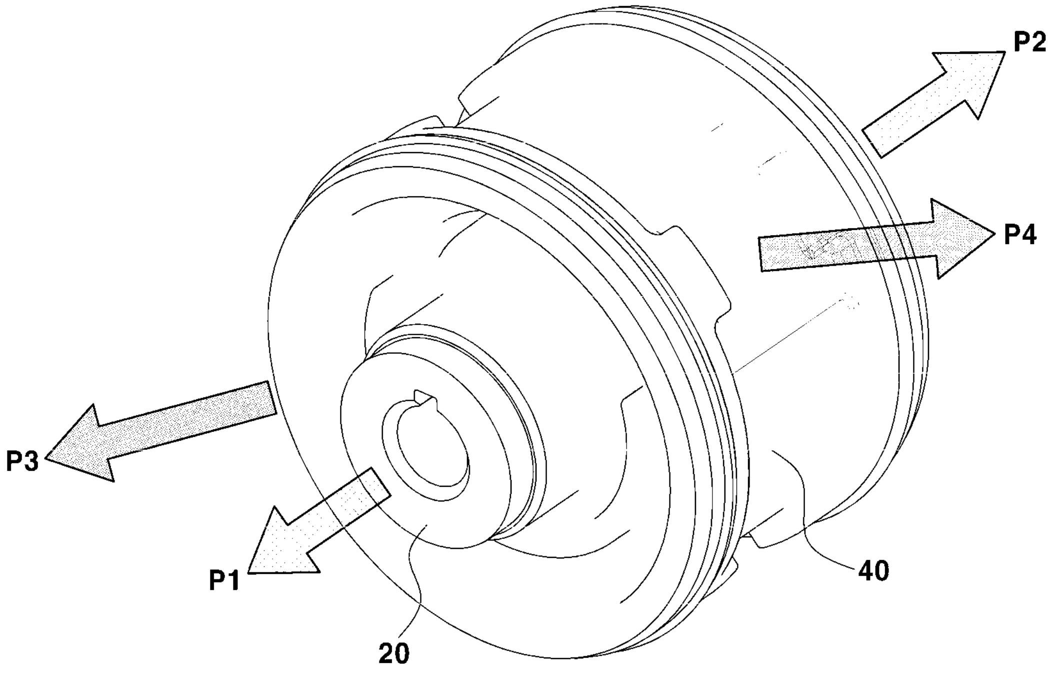
FIG. 8 shows mold withdrawal directions for manufacturing the hydraulic mount according to an exemplary embodiment of the present disclosure.

Referring to FIGS. 7 and 8, the bush-type hydraulic mount 1 according to an exemplary embodiment of the present disclosure may be manufactured as follows. In an exemplary embodiment of the present disclosure, the hydraulic mount 1 may be manufactured using a mold.

As described above, the hydraulic mount 1 includes four fluid chambers 140, 240, 340, 440. When four molds are used to form the four fluid chambers 140, 240, 340, 440, it is difficult to vulcanize rubber. Accordingly, the preset disclosure may apply only two molds 600*a*, 600*b* by applying a diagonal symmetric structure. Therefore, a total of four molds which include two molds in the axial direction (directions P1 and P2) and two molds in a diagonal direction (directions P3 and P4) may be used for the hydraulic mount 1. According to an exemplary embodiment of the present disclosure, the number of molds decreases from six to four in comparison to the related art, so it is possible to improve workability and reduce the cost.

Figure 9A:
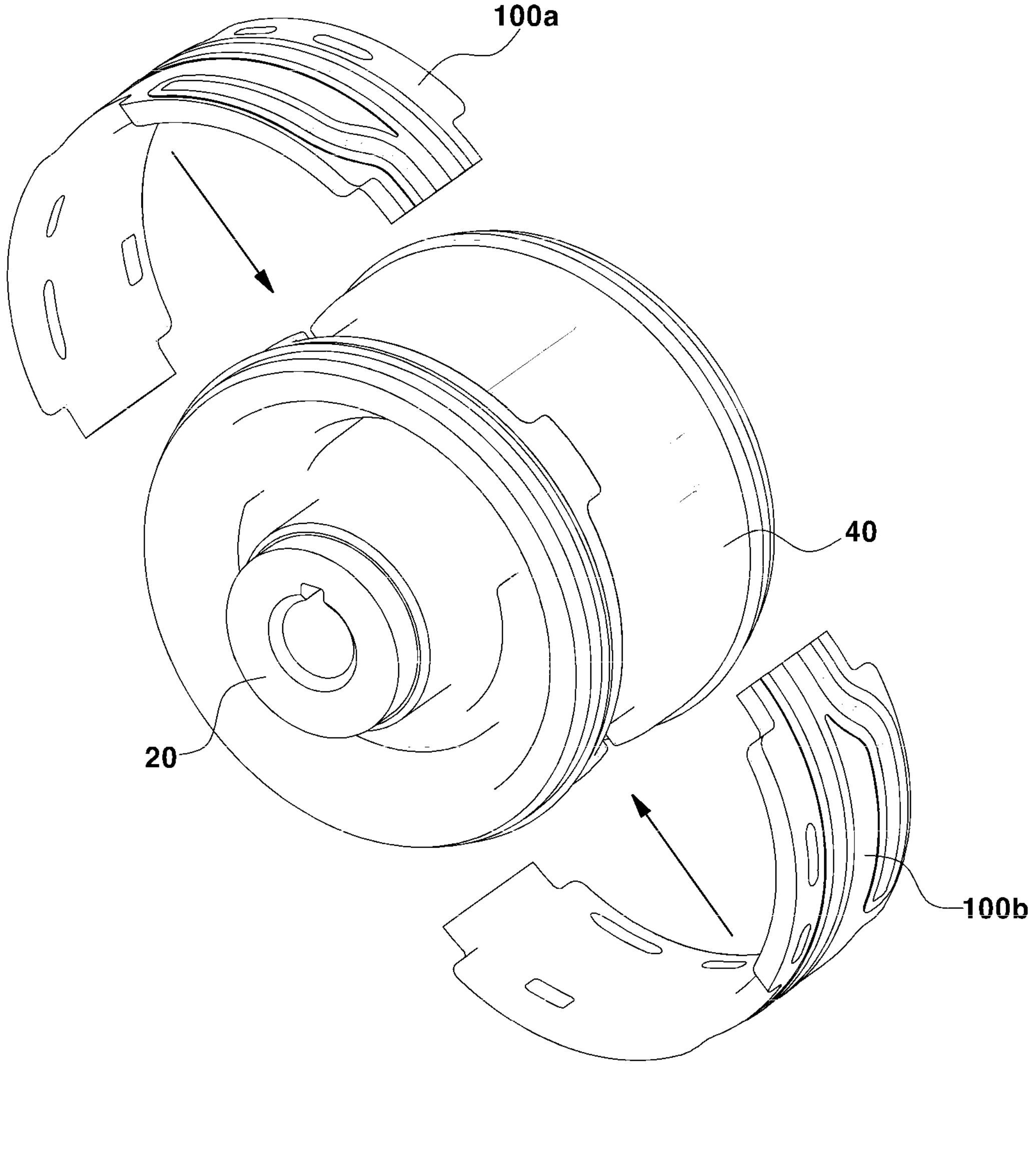
FIG. 9A and FIG. 9B show an assembly process of the hydraulic mount according to an exemplary embodiment of the present disclosure.
Figure 9B:
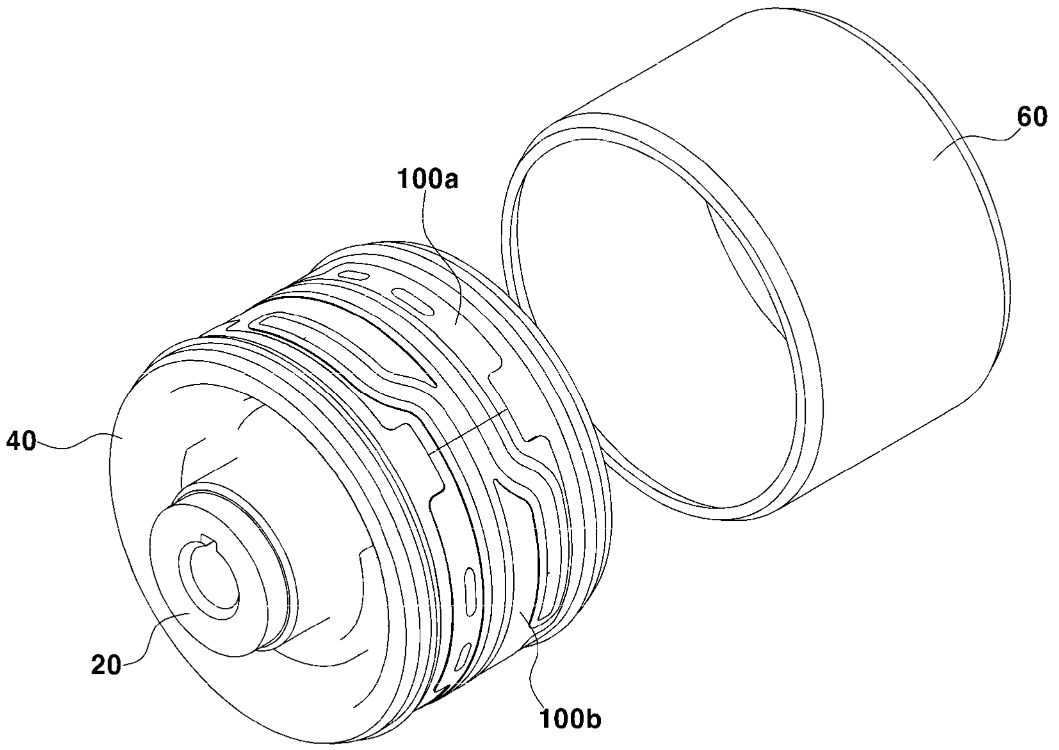

FIG. 9A and FIG. 9B are referred to in relation to manufacturing of the bush-type hydraulic mount 1. The main rubber 40 is vulcanized between the internal pipe 20 and the middle pipe 80. Then the nozzles 100*a*, 100*b* are mounted to the main rubber 40. The first nozzle 100*a* and the second nozzle 100*b* are sequentially mounted. The first nozzle 100*a* and the second nozzle 100*b* are mounted in a same diagonal direction as in previous mold withdrawal. The external pipe 60 is inserted into the main rubber 40 combined with the nozzles 100*a*, 100*b* and swaging is performed, whereby assembly may be finished. Swaging of the nozzles 100*a*, 100*b* and swaging of the external pipe 60 are both performed in fluid.

Figure 10:
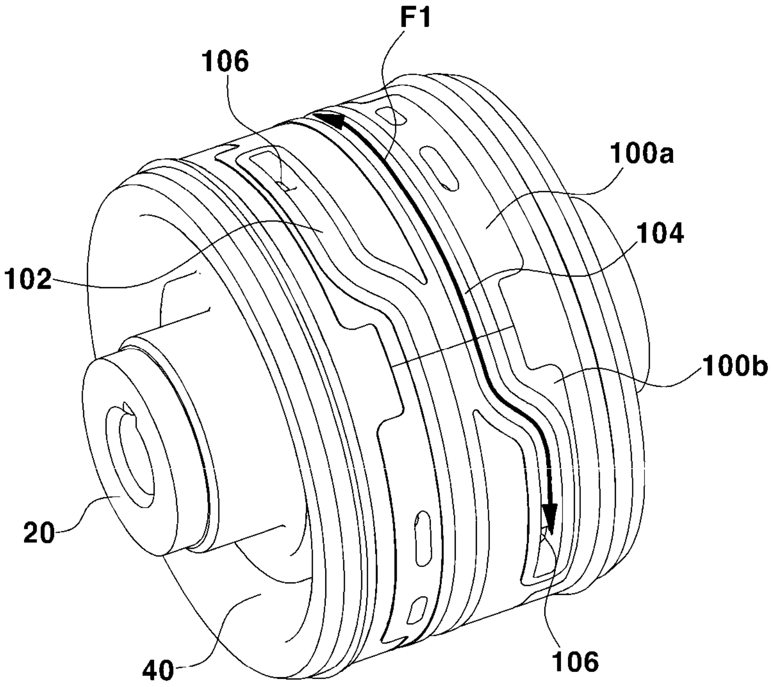
FIG. 10, and FIG. 11 show front and rear damping of the hydraulic mount according to an exemplary embodiment of the present disclosure.
Figure 11:
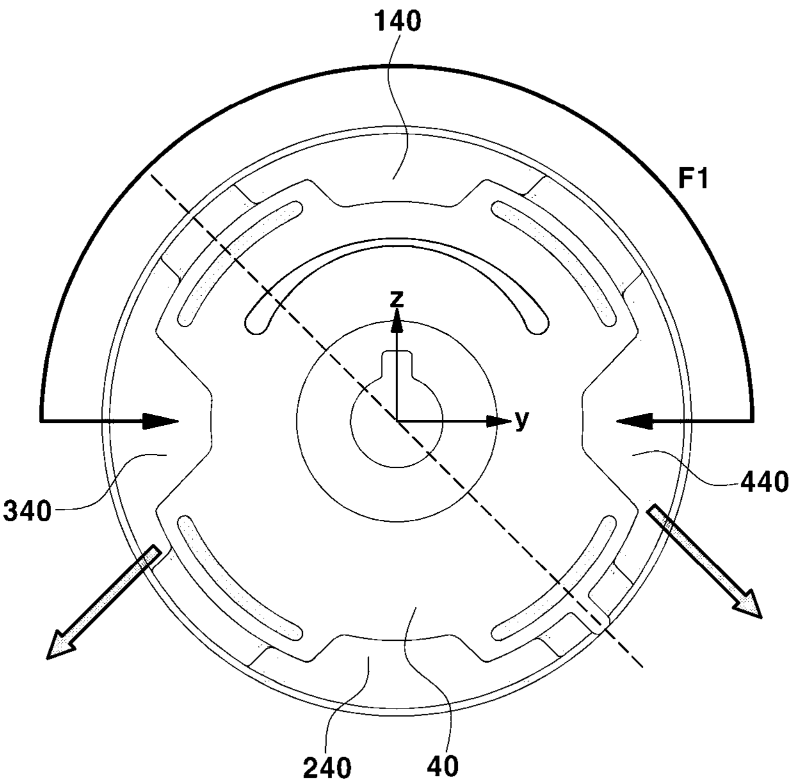

In FIG. 10, and FIG. 11, a fluid flow F1 between the front fluid chamber 340 and the rear fluid chamber 44 in front and rear movement is shown. When the internal pipe 20 is moved in the front and rear direction (y direction), the fluid flow F1 is generated between the front fluid chamber 340 and the rear fluid chamber 440 and damping is provided.

Figure 12:
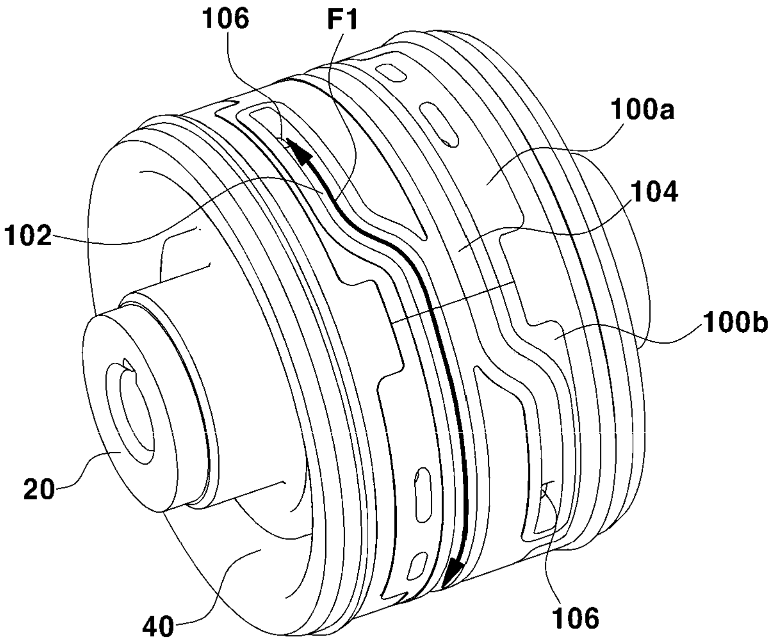
FIG. 12, and FIG. 13 show up and down damping of the hydraulic mount according to an exemplary embodiment of the present disclosure.
Figure 13:
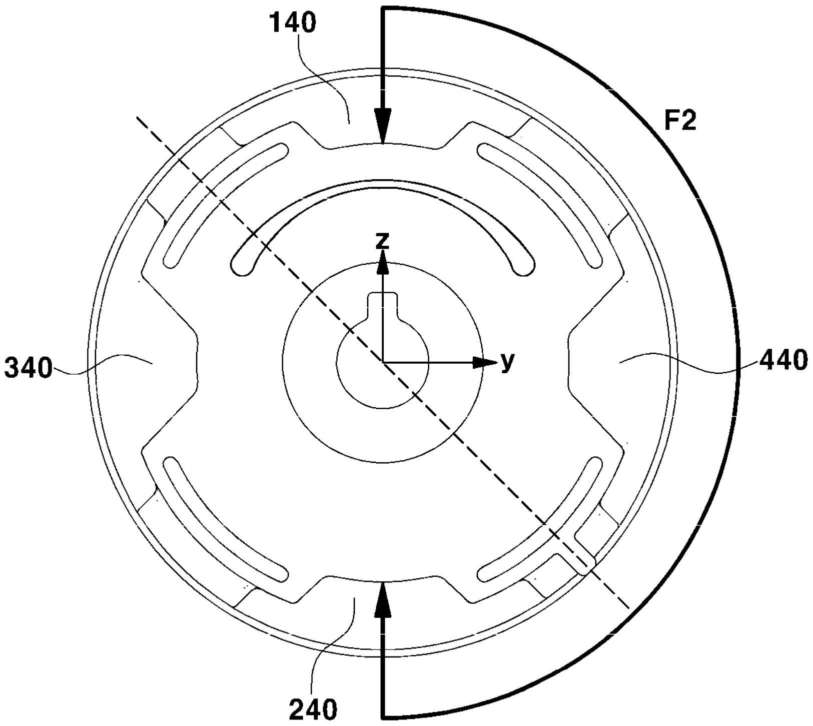

In FIG. 12, and FIG. 13, a fluid flow F2 between the upper fluid chamber 140 and the lower fluid chamber 240 when the electric vehicle V is moved in the up and down direction is shown. When the internal pipe 20 is moved in the up and down direction (z direction), the fluid flow F2 is generated between the upper fluid chamber 140 and the lower fluid chamber 240 and a damping value is given.

The hydraulic mount according to an exemplary embodiment of the present disclosure may be applied to a vehicle. The hydraulic mount may be applied as a mount for a PE module and a motor of an electric vehicle. However, the hydraulic mount according to an exemplary embodiment of the present disclosure may be applied not only to a pure electric vehicle, but to a hybrid electric vehicle and a plug-in hybrid electric vehicle and may be applied as a mount for an engine vehicle.

The hydraulic mount 1 according to an exemplary embodiment of the present disclosure can provide an effect of not only reducing a sense of remaining vibration due to uneven road conditions, such as bumps but reducing driving vibration in high-speed driving.

Furthermore, the hydraulic mount 1 according to an exemplary embodiment of the present disclosure can maximize a damping effect and perform damping in two directions of up and down and left and right directions by applying nozzles including channels. Furthermore, because damping is possible in two directions, there is an advantage that the hydraulic mount 1 may be applied to an electric vehicle V regardless of the fitting direction of a PE module.

According to an exemplary embodiment of the present disclosure, the void can improve durability and greatly improve the dynamic characteristic. Furthermore, because a bulge type internal pipe is applied, the high-frequency dynamic characteristic may be additionally improved.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless stated otherwise, a singular expression includes a plural expression unless the context clearly indicates otherwise.

In exemplary embodiments of the present disclosure, "at least one of A and B" may refer to "at least one of A or B" or "at least one of combinations of one or more of A and B". In addition, "one or more of A and B" may refer to "one or more of A or B" or "one or more of combinations of one or more of A and B".

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A bush-type hydraulic mount comprising:

an internal pipe;

an external pipe disposed outside the internal pipe; and a main rubber formed between the internal pipe and the external pipe, wherein the main rubber includes a plurality of fluid chambers filled with a fluid and configured to fluidically-communicate with each other, wherein the main rubber includes a void formed through the main rubber, wherein the plurality of fluid chambers includes:

an upper fluid chamber formed at an upper portion of the main rubber with respect to an axial direction of the internal pipe;

a lower fluid chamber configured to fluidically-communicate with the upper fluid chamber and formed at a lower portion of the main rubber with respect to the axial direction of the internal pipe;

a front fluid chamber formed at a first side between the upper fluid chamber and the lower fluid chamber with respect to the axial direction of the internal pipe; and a rear fluid chamber configured to fluidically-communicate with the front fluid chamber and formed at a second side between the upper fluid chamber and the lower fluid chamber with respect to the axial direction of the internal pipe, and wherein the fluid moves between the upper fluid chamber and the lower fluid chamber based on the internal pipe moving in a first direction, and wherein the fluid moves between the front fluid chamber and the rear fluid chamber based on the internal pipe moving in a second direction.

2. The bush-type hydraulic mount of claim 1, wherein the void is configured to extend in a circumferential direction of the hydraulic mount at a position between the internal pipe and the external pipe.

3. The bush-type hydraulic mount of claim 1, wherein the first direction and the second direction is perpendicular to each other with respect to the axial direction of the internal pipe.

4. The bush-type hydraulic mount of claim 1, wherein the void is formed between the upper fluid chamber and the internal pipe.

5. The bush-type hydraulic mount of claim 1, wherein the void is formed between the lower fluid chamber and the internal pipe.

6. The bush-type hydraulic mount of claim 1, further including:

a nozzle disposed on an external circumferential surface of the main rubber, wherein the nozzle includes an up and down channel configured to fluidically connect the upper fluid chamber and the lower fluid chamber to each other.

7. The bush-type hydraulic mount of claim 1, wherein the nozzle further includes a front and rear channel configured to fluidically connect the front fluid chamber and the rear fluid chamber to each other.

8. The bush-type hydraulic mount of claim 7, wherein a hole is formed at an end portion of each of an up and down channel and the front and rear channel, so that the fluid flows between the upper fluid chamber, the lower fluid chamber, the front fluid chamber and the rear fluid chamber therethrough.

9. The bush-type hydraulic mount of claim 1, wherein the upper fluid chamber and the lower fluid chamber are formed in the first direction of the hydraulic mount and the front fluid chamber and the rear fluid chamber are formed in the second direction perpendicular to the first direction.

10. The bush-type hydraulic mount of claim 1, further including a middle pipe disposed inside the main rubber.

11. The bush-type hydraulic mount of claim 1, wherein the main rubber includes a flap protruding from a surface of the main rubber and extending in a circumferential direction of the main rubber.

12. The bush-type hydraulic mount of claim 2, wherein the void includes only one void formed in the main rubber.

13. A method of manufacturing a bush-type hydraulic mount including an internal pipe and a main rubber formed outside the internal pipe and including four fluid chambers, the method comprising:

disposing a first mold configured to form a first fluid chamber and a second fluid chamber of the four fluid chambers; and disposing a second mold configured to form a third fluid chamber and a fourth fluid chamber of the four fluid chambers.

14. The method of claim 13, further including:

assembling a first nozzle to the main rubber, wherein the first nozzle includes a first channel configured to fluidically connect the first fluid chamber and the second fluid chamber to each other; and assembling a second nozzle to the main rubber, wherein the second nozzle includes a second channel configured to fluidically connect the third fluid chamber and the fourth fluid chamber to each other.

15. The method of claim 14, further including assembling an external pipe outside the main rubber mounted with the first nozzle and the second nozzle.

16. The method of claim 14, wherein the first fluid chamber and the second fluid chamber are formed in a first direction of the hydraulic mount and the third fluid chamber and the fourth fluid chamber are formed in a second direction perpendicular to the first direction.

* * * * *